United States Patent Office 3,445,011
Patented May 20, 1969

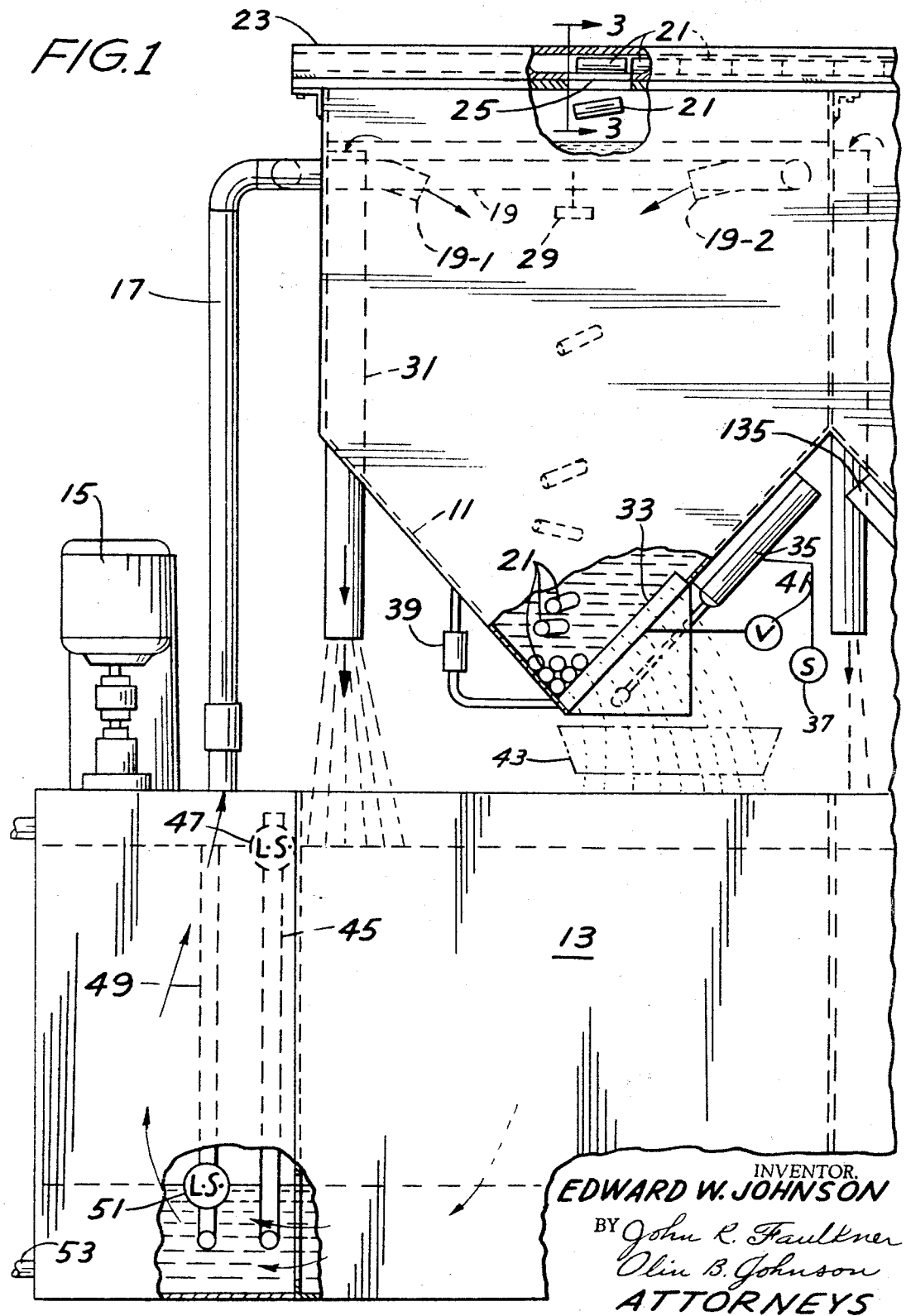

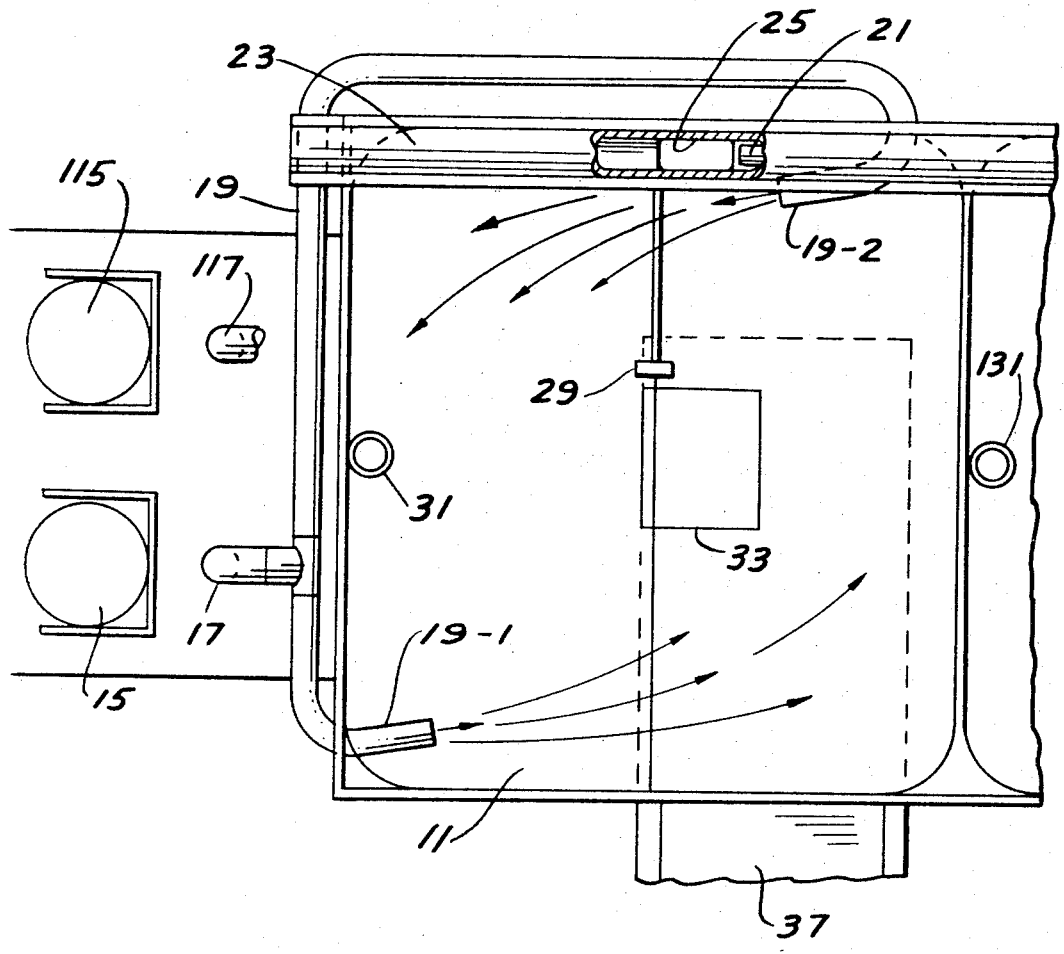
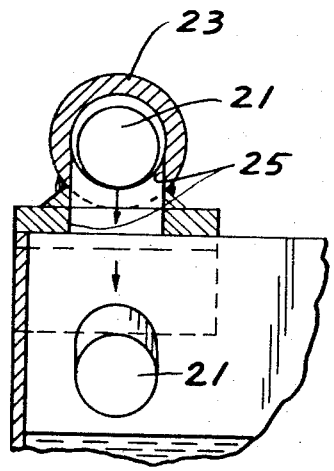

3,445,011
METHOD AND APPARATUS FOR BULK STORAGE OF OBJECTS
Edward W. Johnson, North Olmsted, Ohio, assignor to Ford Motor Company, Dearborn, Mich., a corporation of Delaware
Filed Dec. 22, 1966, Ser. No. 603,855
Int. Cl. B65g 65/32, 51/00
U.S. Cl. 214—17                                   9 Claims

ABSTRACT OF THE DISCLOSURE

A method and apparatus for the bulk storage of objects in a liquid filled storage zone. The objects are directed to the storage zone from above and fall through the liquid due to gravity. The rate of fall of the objects through the liquid is diminished by turbulence caused in a liquid. This turbulence causes forces on the falling objects acting against the force of gravity.

---

This invention relates to an improved method and apparatus for bulk storage of a plurality of objects. In particular, this invention is concerned with a simplified method and apparatus for storing large numbers of objects which because of their relative softness are subject to surface deformations if forcefully brought into contact with each other or with a hard object. More particularly, this invention is concerned with a method and apparatus for storing relatively small objects which comprises rapid, gravitational deposition of such objects upon each other within a storage zone while reducing the force of their contact with each other and with the retainer in which they are deposited by arresting their fall with a liquid cushion swirling in a plane substantially perpendicular to their direction of fall.

Rapid storage of large quantities of relatively small objects which are subject to surface damage, e.g. relatively soft, extruded metal parts, is required in many mass production industries. Frequently, as in the illustrated embodiment hereinafter described, such objects are stored to await further processing, e.g. a heat treating step which renders them less subject to surface damage, commonly referred to as "nicking." In other instances, there may be need for their storage prior to employment in the assembly in which they are to form a part. Rapid storage of such objects in the smallest feasible space requires both method and apparatus that will minimize defacement of such objects. It is possible to effect such storage with relatively complicated, customized, automated machinery but often the cost of such equipment is prohibitive. The method and apparatus of this invention provides a rapid, efficient means for storing such parts at a relatively low cost.

It is one object of this invention to provide rapid, low cost, relatively damage-free storage for large numbers of relatively small objects.

This and other objects and advantages will become apparent from the following detailed description of one embodiment of this invention when read in conjunction with the accompanying drawings wherein:

FIGURE 1 is a schematic side view of one embodiment of apparatus which may be used to carry out the method of this invention with portions of duplcate apparatus positioned adjacent thereto;

FIGURE 2 is a plan view of the apparatus shown in FIGURE 1; and

FIGURE 3 is a sectional view taken along line 3—3 of FIGURE 1.

Referring now to the drawing, there is shown a storage unit and adjacent thereto portions of a duplicate unit. Advantageously, at least two such units are employed together allowing one to be filled while the other is full or is being emptied. The unit here shown comprises a storage hopper 11. Hopper 11 is rigidly supported and positioned above tank 13 which serves as the reservoir for the liquid medium employed to cushion the fall of objects into hopper 11, e.g. water or water containing a rust preventative such as a water miscible oil.

Water, or other suitable liquid, from tank 13 is introduced into hopper 11 via pump 15, conduit 17, conduit 19 and nozzles 19–1 and 19–2. The interior walls of hopper 11 are curved opposite the corners of the exterior walls to facilitate the swirling action employed to arrest the rate or fall of objects introduced for storage. Hopper 11 is provided with an overflow pipe 31 through which water is returned to tank 13 when filling of the hopper with objects causes the water level to rise above its top.

In this embodiment, piston pins, hollow tubes about 3 inches long and having an outside diameter of about 1 inch are conveyed to hopper 11 via a tube conveyor, a portion of which, tube 23, bears an outlet slot 25 and is rotatable about its axis. When hopper 11 is to be filled tube 23 is rotated so as to position slot 25 to open downwardly allowing pins 21 to fall into hopper 11. When there is no feed to hopper 11, tube 23 may be rotated so as to position slot 25 to open upwardly and permit the pins 21 to pass on to another hopper. It will be understood that this invention is not limited to any particular feed mechanism for the parts to be stored and that tube 23 is merely illustrative of one type of conveyor which can be used for this purpose.

Positioned within hopper 11 is load limit indicator 29. In this particular embodiment, indicator 29 comprises a propeller-like blade that rotates until interfered with by a pile-up of pins 21 in hopper 11. When the loaded pins restrict the rotation of indicator 29, an electrical circuit with which indicator 29 is operatively connected actuates a signal to the operator. This signal notifies the operator to terminate the feed of pins 21 to hopper 11 and, if desired, initiate feed to another hopper. In a second embodiment, restriction of indicator 29 actuates an electrical circuit which automatically terminates the feed of pins to hopper 11 and also terminates the flow of water to hopper 11 by shutting off pump 15. Indicator 29 is advantageously positioned below the top of overflow pipe 31 to avoid loss of pins 21 through overflow pipe 31. Indicator 29 can be employed as a safety mechanism to indicate a full hopper and terminate feed should limit switch 47, hereinafter discussed, fail to perform its function.

Hopper 11 is provided with a door 33 operatively connected to an air cylinder 35 which in turn is operatively connected to actuation means here represented by switch 37. Switch 37 may be merely mechanical means of the type conventionally employed to actuate pneumatically operated mechanisms, a conventional electrical switch energizing an electrical circuit which in turn effects actuation of the air cylinder, etc. Door 33 is deliberately designed to permit draining throughout th efilling operation and after the feed of pins has been terminated. If an attempt is made to open door 33 before such drainage is complete, protection against the sudden release of large quantities of liquid is provided by door control 39. Door control 39 includes water level sensing means and switching means which prevent the opening of door 33 when the water level in hopper 11 is above a predetermined level.

Optionally, hopper 11 may be equipped with a manually operated drain mechanism here indicated by valve 41. Valve 41 and suitable associated screens can be employed as drainage means when normal drainage is prevented.

Positioned below door 33 is a conveyor or chute 43 which may be associated with vibrator means when suitable. The pins 21 are emptied from hopper 11 through door 33 to chute 43 from which they are taken to the next processing step. By moving pins 21 to chute 43 in large bulk quantities, surface damage is again minimized.

Tank 13 is provided with two water level control means here illustrated by tube 45 and upper water level limit switch 47 and by tube 49 and lower water level limit switch 51. When the water level in tank 13 rises to actuate limit switch 47, this indicates that a sufficient number of pins have entered hopper 11 to essentially displace the water therein and to indicate that the hopper is filled. Actuation of switch 47 shuts off the pump 15 and terminates the flow of water to hopper 11. When the water in tank 13 falls to actuate switch 51, this indicates that there is insufficient water in the system. Since this may endanger the pumping mechanism as well as interfere with the proper operation of the storage of pins 21, actuation of switch 51 shuts off pump 15. In addition, actuation of switches 47 and 51 is utilized either to signal the operator to terminate feed of pins 21 or automatically terminates same. Tank 13 may be drained via conduit 53.

Also shown in the drawings are some of the corresponding portions of an adjoining duplicate unit, namely pump 115, conduit 117, overflow pipe 131 and air cylinder 135.

The storage operation is initiated by first filling hopper 11 to overflow with water, or other suitable liquid from tank 13. The pins 21 are introduced and the flow of water to hopper 11 continued until a signal is received indicating that the hopper has been filled. It will be understood by those skilled in the art that the quantitative water flow to the hopper and the degree of turbulence required will require adjustment to the storage system contemplated taking into consideration the size of the storage hopper, the rate of drain therefrom, the density of the objects being stored, etc. Illustrative of this is an operative system having a rated storage capacity of 35,000 of the piston pins aforedescribed. To this hopper water containing soluble oil for rust prevention is fed through two 2-inch nozzles, 19–1 and 19–2, at the combined rate of 150 gallons per minute by a pump capable of providing at least a 50-foot head. Parts delivered to the storage hopper are dropped into the swirling water which reduces their falling velocity and cushions their fall. When the compartment is filled to the predetermined limit, it is allowed to drain and the parts are available for use.

The foregoing detailed description of this embodiment of apparatus for carrying out the method of this invention is submitted solely for purposes of illustration. Those skilled in the art will be aware that numerous modifications can be made in the aforedescribed system.

I claim:

1. A method for bulk storage of a plurality of objects comprising in combination providing an enclosed storage zone, drainage means operatively connected with said storage zone and overflow means operatively connected with said storage zone, filling a substantial portion of said storage zone with liquid, introducing said objects into the liquid filled portion of said storage zone from a location above said storage zone while materially impeding the rate of fall of said objects through said liquid by causing a liquid turbulence in said storage zone that exerts forces on said objects acting against the force of gravity, said turbulence being caused by continued introduction of liquid into said storage zone, and while recovering liquid from said storage zone simultaneously from said overflow means and said drainage means, terminating the introduction of said objects to said storage zone when the objects therein reach a predetermined level, terminating the flow of liquid into said storage zone, and draining the remaining liquid from said storage zone through said drainage means.

2. The method of claim 1 wherein said liquid consists essentially of water.

3. The method of claim 1 wherein the liquid level in said storage zone is sufficient to cause escape of said liquid through said overflow means prior to introduction of said objects.

4. The method of claim 1 wherein said liquid is introduced into said storage zone from at least two spaced apart locations at a rate and in a manner which provide swirling of the liquid within said storage zone in a plane substantially perpendicular to the direction of entry of said objects into said storage zone.

5. Apparatus for use in bulk storage of objects comprising in combination, a storage vessel positioned above reservoir means, conduit means, turbulence producing means and pumping means through which liquid can be transferred from said reservoir means into said storage vessel, fill said storage vessel to a predetermined level and provide turbulence therein sufficient to arrest the fall of objects into said storage vessel, drainage means operatively connected with said storage vessel through which said liquid can drain from said storage vessel into said reservoir means, overflow means operatively connected with said storage vessel through which liquid can escape by gravitational flow from said storage vessel into said reservoir means when the liquid level within said storage vessel reaches a predetermined level, conveyor means for introducing objects into said storage vessel, and a water level actuated limit switch in fluid communication with said reservoir means operatively connected with said pumping means in a manner such that its actuation will terminate the action of said pumping means.

6. Apparatus in accordance with claim 5 wherein said limit switch also provides the signal for termination of introduction of said objects into said storage vessel.

7. Apparatus in accordance with claim 5 including load limit means within said storage vessel which signal the filling of said vessel with said objects to a predetermined level.

8. Apparatus in accordance with claim 5 including a second water level actuated limit switch within said reservoir means which gives signal when the water level therein falls below a predetermined level.

9. Apparatus in accordance with claim 5 wherein said storage vessel includes an outlet door for gravity release of stored objects when actuated, said door being operatively connected with control means preventing the opening of said door when the water level within said storage vessel is above a predetermined level.

References Cited

UNITED STATES PATENTS 2,503,210   4/1950   O'Halloran _____ 214—152
2,649,380   8/1953   Flynn _____ 214—17 X ROBERT G. SHERIDAN, *Primary Examiner.*

U.S. Cl. X.R.

214—152; 302—14